(12) United States Patent
Saito et al.

(10) Patent No.: US 9,153,843 B2
(45) Date of Patent: Oct. 6, 2015

(54) NEGATIVE ELECTRODE INCLUDING SOLID ELECTROLYTE INTERFACE COATING CONTAINING CROSSLINKED ISOCYANATE COMPOUND, NONAQUEOUS ELECTROLYTE SECONDARY BATTERY AND METHOD FOR MANUFACTURING THE SAME

(75) Inventors: Shunsuke Saito, Fukushima (JP); Ichiro Yamada, Fukushima (JP); Atsumichi Kawashima, Fukushima (JP); Tadahiko Kubota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 239 days.

(21) Appl. No.: 12/854,559

(22) Filed: Aug. 11, 2010

(65) Prior Publication Data

US 2011/0052953 A1 Mar. 3, 2011

(30) Foreign Application Priority Data

Aug. 26, 2009 (JP) ................ P2009-195589

(51) Int. Cl.
| | |
|---|---|
| *H01M 4/62* | (2006.01) |
| *H01M 10/0567* | (2010.01) |
| *H01M 10/0568* | (2010.01) |
| *H01M 10/0569* | (2010.01) |
| *H01M 10/058* | (2010.01) |
| *H01M 4/139* | (2010.01) |

(Continued)

(52) U.S. Cl.
CPC ............ *H01M 10/058* (2013.01); *H01M 4/139* (2013.01); *H01M 4/366* (2013.01); *H01M 10/0565* (2013.01); *H01M 10/0583* (2013.01); *H01M 2004/027* (2013.01); *H01M 2300/0082* (2013.01); *Y02E 60/122* (2013.01); *Y10T 29/49115* (2015.01)

(58) Field of Classification Search
CPC . H01M 4/139; H01M 4/366; H01M 10/0565; H01M 10/058; H01M 10/0583
USPC ................... 429/94, 317, 334, 337, 339, 341; 29/623.5
See application file for complete search history.

(56) References Cited

U.S. PATENT DOCUMENTS 6,156,080 A * 12/2000 Kumeuchi et al. ........... 29/623.1
7,781,094 B2 8/2010 Yamada et al.

(Continued)

FOREIGN PATENT DOCUMENTS

| JP | 09-082313 | 3/1997 |
|---|---|---|
| JP | 2001-176498 | 6/2001 |

(Continued)

OTHER PUBLICATIONS

Japanese Office Action issued Nov. 5, 2013 for Japanese Appln. No. 2009-195589.

*Primary Examiner* — Sean P Cullen
(74) *Attorney, Agent, or Firm* — K&L Gates LLP (57) ABSTRACT

A negative electrode includes: a negative electrode collector; and a negative electrode active material layer covering at least one principal plane of the negative electrode collector and containing at least a negative electrode active material, wherein the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound.

16 Claims, 3 Drawing Sheets

(51) Int. Cl.
  *H01M 4/36* (2006.01)
  *H01M 10/0565* (2010.01)
  *H01M 10/0583* (2010.01)
  *H01M 4/02* (2006.01)

(56) References Cited

U.S. PATENT DOCUMENTS

2007/0015062 A1* 1/2007 Lee et al. .................. 429/329
2007/0059605 A1* 3/2007 Nakamura et al. .......... 429/246

FOREIGN PATENT DOCUMENTS

| | | |
|---|---|---|
| JP | 2002-373643 | 12/2002 |
| JP | 2003-059492 | 2/2003 |
| JP | 2003-086251 | 3/2003 |
| JP | 2005-259641 | 9/2005 |
| JP | 2005259641 A * | 9/2005 |
| JP | 2006-164759 | 6/2006 |
| JP | 2007-026730 | 2/2007 |
| JP | 2007-242411 | 9/2007 |
| JP | 2009-054319 | 3/2009 |
| WO | 2005/049318 | 6/2005 |

* cited by examiner

NEGATIVE ELECTRODE INCLUDING SOLID ELECTROLYTE INTERFACE COATING CONTAINING CROSSLINKED ISOCYANATE COMPOUND, NONAQUEOUS ELECTROLYTE SECONDARY BATTERY AND METHOD FOR MANUFACTURING THE SAME

CROSS REFERENCES TO RELATED APPLICATIONS

The present application claims priority to Japanese Priority Patent Application JP 2009-195589 filed in the Japan Patent Office on Aug. 26, 2009, the entire contents of which is hereby incorporated by reference.

BACKGROUND

The present application relates to a negative electrode, a nonaqueous electrolyte secondary battery and a method for manufacturing a nonaqueous electrolyte secondary battery.

In more detail, the present application relates to a negative electrode including a negative electrode collector and a negative electrode active material layer covering at least one principal plane of the negative electrode collector and containing at least a negative electrode active material, in which the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound; a nonaqueous electrolyte secondary battery; and a method for manufacturing a nonaqueous electrolyte secondary battery.

In recent years, a number of portable electronic appliances such as a camera-integrated video tape recorder, a digital still camera, a mobile phone, a personal digital assistant and a laptop computer have appeared, and it is contrived to achieve downsizing and weight reduction thereof.

With respect to batteries, in particular, secondary batteries as a portable power source for such a portable electronic appliance, research and development have been actively conducted for the purpose of enhancing the energy density.

Above all, lithium ion secondary batteries using a carbon material for a negative electrode active material, a complex material of lithium (Li) and a transition metal for a positive electrode active material and a carbonate mixture for an electrolytic solution are widely put into practical use because a large energy density is obtained as compared with lead batteries and nickel-cadmium batteries which are an aqueous electrolytic solution secondary battery of the related art.

In particular, laminate type batteries using an aluminum laminated film for an exterior member are lightweight, and therefore, the energy density is large.

In such a laminate type battery, when an electrolytic solution is swollen in a polymer, deformation of the laminate type battery can be suppressed, and therefore, laminate polymer type batteries are also widely put into practical use.

However, the laminate type battery involved such a problem that it is easy to cause blister in a high-temperature atmosphere because its exterior member is soft.

With respect to the problem that blister is easily caused at the time of high-temperature storage, there is proposed a nonaqueous electrolyte secondary battery in which a solid electrolyte interface coating is formed on a negative electrode at the time of initial charge using a nonaqueous electrolytic solution containing a prescribed isocyanate compound (see JP-A-2006-164759 and JP-A-2007-242411).

SUMMARY

However, even in the nonaqueous electrolyte secondary batteries of the above-cited JP-A-2006-164759 and JP-A-2007-242411, the solid electrolyte interface coating is formed on the negative electrode by the prescribed isocyanate compound only at the time of initial charge. Therefore, there was involved such a problem that it may be impossible to suppress the generation of a gas at the time of initial charge, and a blister-suppressing effect at the time of high-temperature storage is not sufficient.

Thus, it is desirable to provide a negative electrode capable of sufficiently revealing a blister-suppressing effect at the time of high-temperature storage, a nonaqueous electrolyte secondary battery and a method for manufacturing a nonaqueous electrolyte secondary battery.

The present inventors made extensive and intensive investigations.

As a result, it has been found that the foregoing desire can be achieved by the use of a negative electrode including a negative electrode collector and a negative electrode active material layer covering at least one principal plane of the negative electrode collector and containing at least a negative electrode active material, in which the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound, leading to accomplishment of embodiments according to the present application.

That is, according to an embodiment, there is provided a negative electrode including a negative electrode collector and a negative electrode active material layer covering at least one principal plane of the negative electrode collector and containing at least a negative electrode active material, in which the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound.

Also, according to another embodiment, there is provided a nonaqueous electrolyte secondary battery including an electrode body having a positive electrode and a negative electrode wound or laminated via a separator, an electrolyte containing a nonaqueous solvent and an electrolyte salt and an exterior member housing them therein, wherein the negative electrode includes a negative electrode collector and a negative electrode active material layer covering at least one principal plane of the negative electrode collector and containing at least a negative electrode active material, in which the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound.

Furthermore, according to still another embodiment, there is provided a method for manufacturing a nonaqueous electrolyte secondary battery including an electrode body having a positive electrode and a negative electrode wound or laminated via a separator, an electrolyte containing a nonaqueous solvent and an electrolyte salt and an exterior member housing them therein, wherein the negative electrode includes a negative electrode collector and a negative electrode active material layer covering at least one principal plane of the negative electrode collector and containing at least a negative electrode active material, in which the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound, which method includes a heat pressing step of heating and pressing the electrode body housed in the exterior member and the electrolyte containing the nonaqueous solvent, the electrolyte salt and the isocyanate compound.

According to the embodiments of the present application, since the negative electrode including a negative electrode collector and a negative electrode active material layer covering at least one principal plane of the negative electrode collector and containing at least a negative electrode active material, in which the negative electrode active material contained in a region of up to at least 50% of a thickness from the surface of the negative electrode active material layer is covered with a solid electrolyte interface coating, and the solid electrolyte interface coating contains a product with a crosslinked isocyanate group in an isocyanate compound is used, it is possible to provide a negative electrode capable of sufficiently revealing a blister-suppressing effect at the time of high-temperature storage, a nonaqueous electrolyte secondary battery and a method for manufacturing a nonaqueous electrolyte secondary battery.

Additional features and advantages are described herein, and will be apparent from the following Detailed Description and the figures.

DETAILED DESCRIPTION

The present application is described below in detail with reference to the drawings according to an embodiment. The detailed description is provided as follows:
1. First embodiment (an example of a negative electrode)
2. Second embodiment (an example of a nonaqueous electrolyte secondary battery)
3. Third embodiment (an example of a method for manufacturing a nonaqueous electrolyte secondary battery)

1. First Embodiment

Configuration of Negative Electrode

Figure 1:
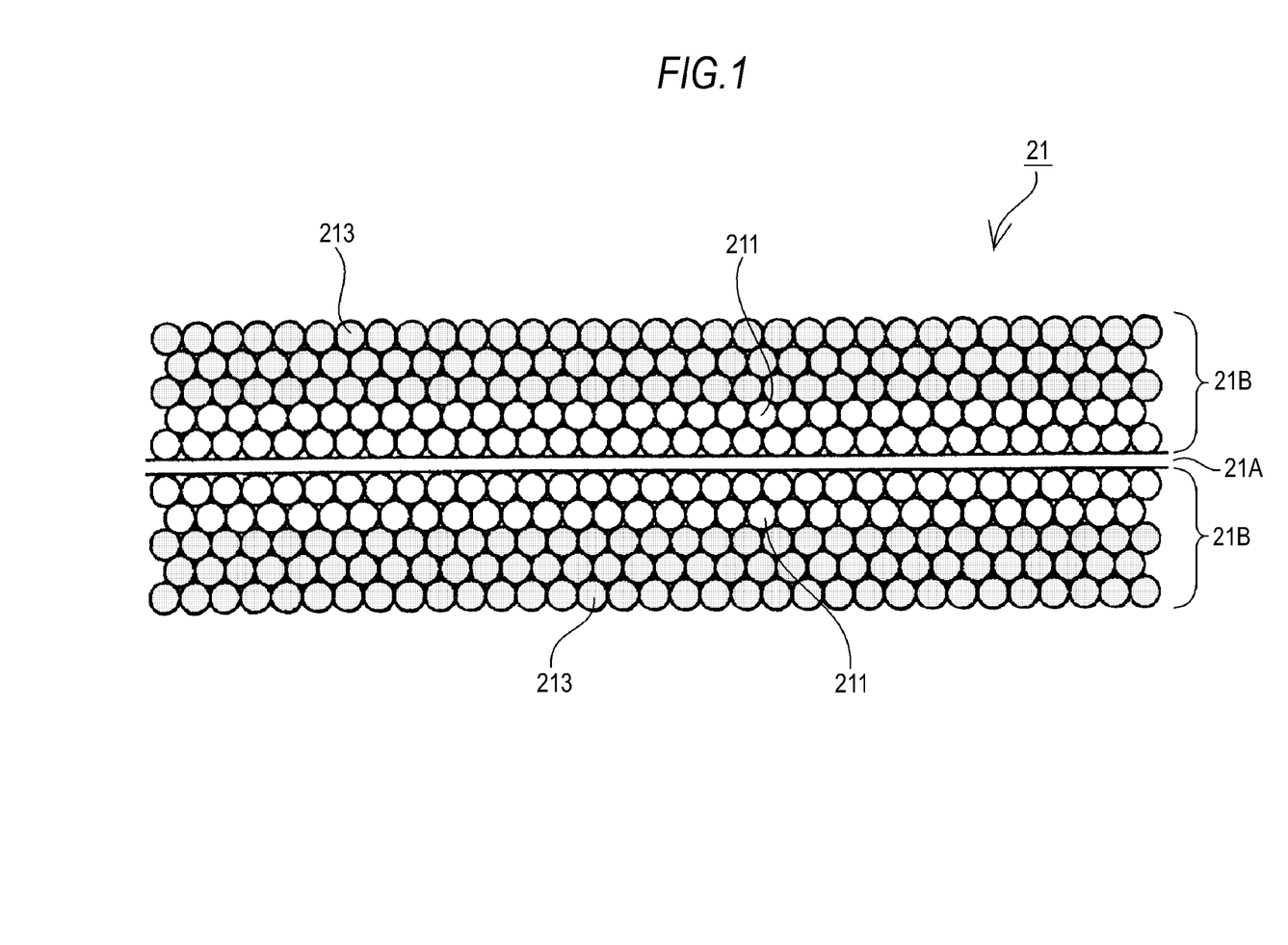
FIG. 1 is a diagrammatic sectional view enlargedly showing a part of an example of a negative electrode according to a first embodiment.

FIG. 1 is a diagrammatic sectional view enlargedly showing a part of an example of a negative electrode according to a first embodiment.

As shown in FIG. 1, a negative electrode 21 has, for example, a structure in which a negative electrode active material layer 21B is formed on the both surfaces of a negative electrode collector 21A having a pair of principal planes opposing to each other.

Also, the negative electrode active material layer 21B contains at least a negative electrode active material 211, and the negative electrode active material contained in a region of up to at least 50% of a thickness from the surface of the negative electrode active material layer 21B is a negative electrode active material 213 having a solid electrolyte interface coating (SEI) (hereinafter referred to as "interface-provided negative electrode active material").

A "region of up to 50% of a thickness from the surface of the negative electrode active material layer" as referred to herein means a region of up to a half of a thickness in a thickness direction of the negative electrode active material layer, and it is preferable that the negative electrode active material contained in a region of up to 80% of a thickness from the surface of the negative electrode active material layer is an interface-provided negative electrode active material.

Also, a "region of up to 100% of a thickness from the surface of the negative electrode active material layer" as referred to herein means the whole region of the negative electrode active material layer. While illustration is omitted, such a case is also included in the scope of the present application.

Furthermore, while illustration is omitted, the negative electrode active material layer 21B may be formed on only one surface of the negative electrode collector 21A.

Negative Electrode Collector

The negative electrode collector is, for example, constituted of a metal foil such as a copper foil, a nickel foil and a stainless steel foil.

Negative Electrode Active Material Layer

The negative electrode active material layer contains, for example, any one kind or two or more kinds of a negative electrode material capable of intercalating and deintercalating lithium and metallic lithium as a negative electrode active material and may further contain a conductive agent and a binder, if desired. Examples of the binder include polyvinylidene fluoride and a styrene butadiene rubber.

Examples of the negative electrode material capable of intercalating and deintercalating lithium include carbon materials, for example, hardly graphitized carbon, easily graphitized carbon, natural or artificial graphite, pyrolytic carbons, cokes, vitreous carbons, organic polymer compound baked materials, carbon fibers, active carbon, etc. Of these, examples of the cokes include pitch coke, needle coke and petroleum coke. The organic polymer compound baked material as referred to herein is a material obtained through carbonization by baking a polymer material such as phenol resins and furan resins at an appropriate temperature, and a part thereof is classified into hardly graphitized carbon or easily graphitized carbon.

Such a carbon material is preferable because a change in the crystal structure to be generated at the time of charge and discharge is very small, a high charge and discharge capacity is obtainable, and favorable cycle characteristics are obtainable. In particular, graphite is preferable because its electrochemical equivalent is large, and a high energy density is obtainable. Also, hardly graphitized carbon is preferable because excellent characteristics are obtainable. Moreover, a material having a low charge and discharge potential, specifically a material having a charge and discharge potential close to that of a lithium metal, is preferable because it is easy to realize a high energy density of the battery.

A polymer material can also be applied, and examples thereof include polyacetylene and polypyrrole.

Also, examples of the negative electrode material capable of intercalating and deintercalating lithium include materials containing, as a constituent element, at least one member selected from the group consisting of metal elements and semi-metal elements capable of forming an alloy together with lithium. This negative electrode material may be a simple substance, an alloy or a compound of a metal element or a semi-metal element. Also, a material having one or two or more kinds of a phase in at least a part thereof may be used.

In the embodiment according to the present application, the alloy also includes an alloy containing one or more kinds of a metal element and one or more kinds of a semi-metal element in addition to alloys composed of two or more kinds of a metal element. Also, the alloy may contain a non-metal element. Examples of its texture include a solid solution, a eutectic (eutectic mixture), an intermetallic compound and one in which two or more kinds thereof coexist.

Examples of such a metal element or semi-metal element include tin (Sn), lead (Pb), magnesium (Mg), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

Above all, a metal element or a semi-metal element belonging to the Group 14 of the long form of the periodic table is preferable; and silicon and tin are especially preferable. This is because silicon and tin have large capability to intercalate and deintercalate lithium and are able to obtain a high energy density.

Examples of alloys of tin include alloys containing, as a second constituent element other than tin, at least one member selected from the group consisting of silicon, magnesium, nickel, copper, iron, cobalt, manganese, zinc, indium, silver, titanium (Ti), germanium, bismuth, antimony and chromium (Cr).

Examples of alloys of silicon include alloys containing, as a second constituent element other than silicon, at least one member selected from the group consisting of tin, magnesium, nickel, copper, iron, cobalt, manganese, zinc, indium, silver, titanium, germanium, bismuth, antimony and chromium.

Examples of compounds of tin or silicon include compounds containing oxygen (O) or carbon (C), and these compounds may contain the foregoing second constituent element in addition to tin or silicon.

The foregoing negative electrode material may be an element capable of forming a complex oxide with lithium, such as titanium. As a matter of course, metallic lithium may be deposited and dissolved, or magnesium or aluminum other than lithium can be deposited and dissolved.

Interface-Provided Negative Electrode Active Material

The interface coating of the interface-provided negative electrode active material is an interface coating containing a product with a crosslinked isocyanate group in an isocyanate compound.

The isocyanate group has very large reactivity with alkaline compounds or active hydrogen-containing functional groups such as a hydroxyl group and an amine group, and after the reaction, it is able to form a stable and firm bond such as a urethane bond.

The isocyanate group of the isocyanate compound forms a solid electrolyte interface coating (SEI) derived from the isocyanate compound through a reaction with a hydroxyl group or moisture existing within an electrode mixture such as the negative electrode active material. It is known that a hydroxyl group is present on the surface of graphite.

Isocyanate Compound

Examples of the isocyanate compound include isocyanate compounds represented by any one of the following general formulae (1) to (4). In view of the fact that such an isocyanate compound has both a hydrophobic main chain and a hydrophilic isocyanate group, a surfactant effect is expected, and a desired negative electrode is easily obtainable. It may be considered that in a heat pressing step as described later in detail, the isocyanate compound penetrates into the inside of the electrode, and the carbon atom number of the main chain is large or carbons or hydrogens are substituted, and hence, the solid electrolyte interface coating (SEI) is hardly dissolved so that the interface coating is not dissolved in the electrolytic solution even at the time of high-temperature storage.

$$R^1-N=C=O \qquad (1)$$

In the formula (1), N represents nitrogen; C represents carbon; O represents oxygen; and $R^1$ represents a chain hydrocarbon group having from 1 to 22 carbon atoms, and preferably from 8 to 18 carbon atoms, or a chain hydrocarbon group having from 1 to 22 carbon atoms, and preferably from 1 to 18 carbon atoms, in which at least a part of carbons and/or hydrogens is substituted with at least one member selected from the group consisting of a halogen, oxygen, sulfur, nitrogen and silicon.

$$O=C=N-R^2-N=C=O \qquad (2)$$

In the formula (2), N represents nitrogen; C represents carbon; O represents oxygen; and $R^2$ represents a chain hydrocarbon group having from 7 to 22 carbon atoms, and preferably from 8 to 18 carbon atoms, or a chain hydrocarbon group having from 1 to 22 carbon atoms, and preferably from 8 to 18 carbon atoms, in which at least a part of carbons and/or hydrogens is substituted with at least one member selected from the group consisting of a halogen, oxygen, sulfur, nitrogen and silicon.

$$R^3-N=C=O \qquad (3)$$

In the formula (3), N represents nitrogen; C represents carbon; O represents oxygen; and $R^3$ represents a cyclic hydrocarbon group having from 6 to 20 carbon atoms, and preferably from 6 to 18 carbon atoms, or a cyclic hydrocarbon group having from 6 to 20 carbon atoms, and preferably from 6 to 18 carbon atoms, in which at least a part of carbons and/or hydrogens is substituted with at least one member selected from the group consisting of a halogen, oxygen, sulfur, nitrogen and silicon.

$$O=C=N-R^4-N=C=O \qquad (4)$$

In the formula (4), N represents nitrogen; C represents carbon; O represents oxygen; and R4 represents a cyclic hydrocarbon group having from 6 to 20 carbon atoms, and preferably from 6 to 18 carbon atoms, or a cyclic hydrocarbon group having from 6 to 20 carbon atoms, and preferably from 6 to 18 carbon atoms, in which at least a part of carbons and/or hydrogens is substituted with at least one member selected from the group consisting of a halogen, oxygen, sulfur, nitrogen and silicon.

As the isocyanate compound represented by the foregoing general formula (1), 1-isocyanatooctadecane can be exemplified as a preferred example, but it should not be construed that the isocyanate compound represented by the foregoing general formula (1) is limited thereto. That is, there can be exemplified isocyanate compounds having a chain hydrocarbon group in which carbons and hydrogens are not substituted with a halogen, oxygen, sulfur, nitrogen or silicon, for example, 1-isocyanatohexane, 1-isocyanatoheptane, 1-isocyanatooctane, 1-isocyanatononane, 1-isocyanatodecane, 1-isocyanatoundecane, 1-isocyanatododecane, 1-isocyanatotridecane, 1-isocyanatotetradecane, 1-isocyanatopentadecane, 1-isocyanatohexadecane, 1-isocyanatoheptadecane, 1-isocyanatononadecane, 1-isocyanatoeicosane, etc.

Also, examples of the isocyanate compound represented by the foregoing general formula (1) include isocyanate compounds having a chain hydrocarbon group in which at least a part of carbons and hydrogens is substituted with a halogen, oxygen, sulfur, nitrogen or silicon, for example, 1-isocyanato-6-methoxyhexane, 1-isocyanato-6-ethoxyhexane, ethyl isocyanatoacetate, ethyl 3-isocyanatopropanoate, 2-isocyanatoethyl-2-methyl acrylate, butyl isocyanatoacetate, ethyl 4-isocyanatobutanoate, ethyl 6-isocyanatohexanoate, etc.

In the embodiment according to the present application, preferred examples of the halogen include fluorine, chlorine and bromine.

It may be considered that even when the hydrogen in the molecule is substituted with a halogen, the halogen bound to carbon is inert so that it does not affect battery characteristics, and hence, such a substituted compound has effects equal to those of the non-substituted compound.

In the embodiment according to the present application, it should not be construed that the term "substituted" is limited to those obtained by a so-called substitution reaction. When the explanation is made by reference to specific examples, for example, in the case where chlorobenzene ($C_6H_5Cl$) is obtained by substituting one of hydrogens (H) of benzene ($C_6H_6$) with Cl, as a matter of course, such chlorobenzene is included in the substituted compound. Furthermore, in the embodiment according to the present application, for example, it is interpreted that methanol ($CH_3$—O—H) is one obtained by substituting $CH_2$ which is a part of carbon and hydrogens of ethane ($CH_3$—$CH_2$—H) with oxygen (O), and it should be interpreted so as to mean that this is also included in the substituted compound.

Examples of the isocyanate compound having two isocyanate groups represented by the foregoing general formula (2) include isocyanate compounds having a chain hydrocarbon group in which at least a part of carbons and hydrogens is substituted with a halogen, oxygen, sulfur, nitrogen or silicon, for example, methyl 2,6-diisocyanatohexanoate, dimethyldiisocyanatosilane, 2,2-dimethylpentane-1,5-diyl diisocyanate, dibutyldiisocyanatosilane, diethoxydiisocyanatosilane, ethyldiisocyanatophosphine oxide, methyldiisocyanatophosphine oxide, isopropyldiisocyanatophosphine oxide, butoxydiisocyanatophosphine oxide, etc.

Examples of the isocyanate compound represented by the foregoing general formula (3) include isocyanate compounds having a cyclic hydrocarbon group in which carbons and hydrogens are not substituted with a halogen, oxygen, sulfur, nitrogen or silicon, for example, isocyanatocyclohexane, 1-isocyanato-4-methylcyclohexane, 1-isocyanatoethylcyclohexane, 1-isocyanato-4-propylcyclohexane, 1-isocyanato-4-butylcyclohexane, isocyanatocyclooctane, 1-isocyanatoadamantane, etc.

As the cyclic hydrocarbon group, there can be exemplified not only an alicyclic cyclic hydrocarbon group as in the foregoing compounds but an aromatic cyclic hydrocarbon group.

Preferred examples of the isocyanate compound having two isocyanate groups represented by the foregoing general formula (4) include methylene bis(4,1-cyclohexylene)diisocyanate and methylene bis(4,1-phenylene)diisocyanate, but it should not be construed that the isocyanate compound having two isocyanate groups represented by the foregoing general formula (4) is limited thereto. That is, there can be exemplified isocyanate compounds having an alicyclic cyclic hydrocarbon group in which carbons and hydrogens are not substituted with a halogen, oxygen, sulfur, nitrogen or silicon, for example, 1,3-bis(isocyanatomethyl)cyclohexane, cyclohexane-1,3-diyldiisocyanate, cyclohexane-1,4-diyldiisocyanate, cyclohexane-1,3-diylbis(methylisocyanate), 1-methylcyclohexane-2,4-diyl diisocyanate, etc.

Also, examples of the isocyanate compound having two isocyanate groups represented by the foregoing general formula (4) include isocyanate compounds having an alicyclic cyclic hydrocarbon group in which at least a part of carbons and hydrogens is substituted with a halogen, oxygen, sulfur, nitrogen or silicon, for example, isophorone diisocyanate, etc.

Furthermore, examples of the isocyanate compound having two isocyanate groups represented by the foregoing general formula (4) include isocyanate compounds having an aromatic cyclic hydrocarbon group in which carbons and hydrogens are not substituted with a halogen, oxygen, sulfur, nitrogen or silicon, for example, 2,6-tolylene diisocyanate, 2,4-tolylene diisocyanate, m-phenylenebis(1-methylethane-1,1-diyl)diisocyanate, p-phenylenebis(1-methylethane-1,1-diyl)diisocyanate, p-xylylenediyl diisocyanate, naphthalene-1,5-diyl diisocyanate, 3,3'-dimethylbiphenyl-4,4'-diisocyanate, 1,3-phenylene diisocyanate, 1,4-phenylene diisocyanate, 2-methyl-1,4-phenylene diisocyanate, naphthalene-1,4-diisocyanate, naphthalene-2,6-diyl diisocyanate, naphthalene-2,7-diyl diisocyanate, methylenebis(2,1-phenylene)diisocyanate, naphthalene-1,4-diylbis(methylene)diisocyanate, naphthalene-1,5-diylbis(methylene)diisocyanate, 2,4-dimethyl-1,3-phenylene diisocyanate, 4,6-dimethyl-1,3-phenylene diisocyanate, 2,5-dimethyl-1,3-phenylene diisocyanate, 2-methyl-4,6-diethylbenzene-1,3-diyl diisocyanate, 2,4,6-triethylbenzene-1,3-diyl diisocyanate, 2,6-dimethylbenzene-1,4-diyl diisocyanate, 2,6-diethylbenzene-1,4-diyl diisocyanate, methylenebis(2,6-dimethyl-4,1-phenylene)diisocyanate, methylenebis(3-methyl-4,1-phenylene)diisocyanate, methylenebis(2,6-diisopropyl-4,1-phenylene)diisocyanate, isopropylidenebis(4,1-phenylene) diisocyanate, 9H-fluorene-2,7-diyl diisocyanate, etc.

Furthermore, examples of the isocyanate compound having two isocyanate groups represented by the foregoing general formula (4) include isocyanate compounds having an aromatic cyclic hydrocarbon group in which at least a part of carbons and hydrogens is substituted with a halogen, oxygen, sulfur, nitrogen or silicon, for example, 4-[(2-isocyanatophenyl)oxy]phenyl isocyanate, 4,4'-oxybis(phenyl isocyanate), 2,2'-dimethoxybiphenyl-4,4'-diyl diisocyanate, 1-(trifluoromethyl)-2,2,2-trifluoroethylidenebis(4,1-phenylene)diisocyanate, [hexahydrobiphenyl]-4,4-diyl]diisocyanate, 4-chlorobenzene-1,3-diyl diisocyanate, 2,4-dichlorobenzene-1,3-diisocyanate, 4,6-dichlorobenzene-1,3-diisocyanate, 2,5-dichlorobenzene-1,4-diisocyanate, 4-(trifluoromethyl)benzene-1,3-diyl diisocyanate, 2-(trifluoromethyl)benzene-1,3-diyl diisocyanate, trimethylenedioxybis(4,1-phenylene) diisocyanate, thiobis(4,1-phenylene)diisocyanate, 9H-carbazole-3,6-diyl diisocyanate, diphenyl diisocyanatosilane, diphenoxydiisocyanatosilane, phenyl diisocynanatophosphine oxide, phenoxydiisocyanatophosphine oxide, phenyl diisocyanatophosphine, etc.

In the isocyanate compound, those having from 1 to 4 cyclic structures can be suitably used, and it is not important whether such a cyclic structure is alicyclic or aromatic.

The foregoing isocyanate compound can be used singly, or two or more kinds thereof can be properly mixed and used.

2. Second Embodiment

Configuration of Nonaqueous Electrolyte Secondary Battery

Figure 2:
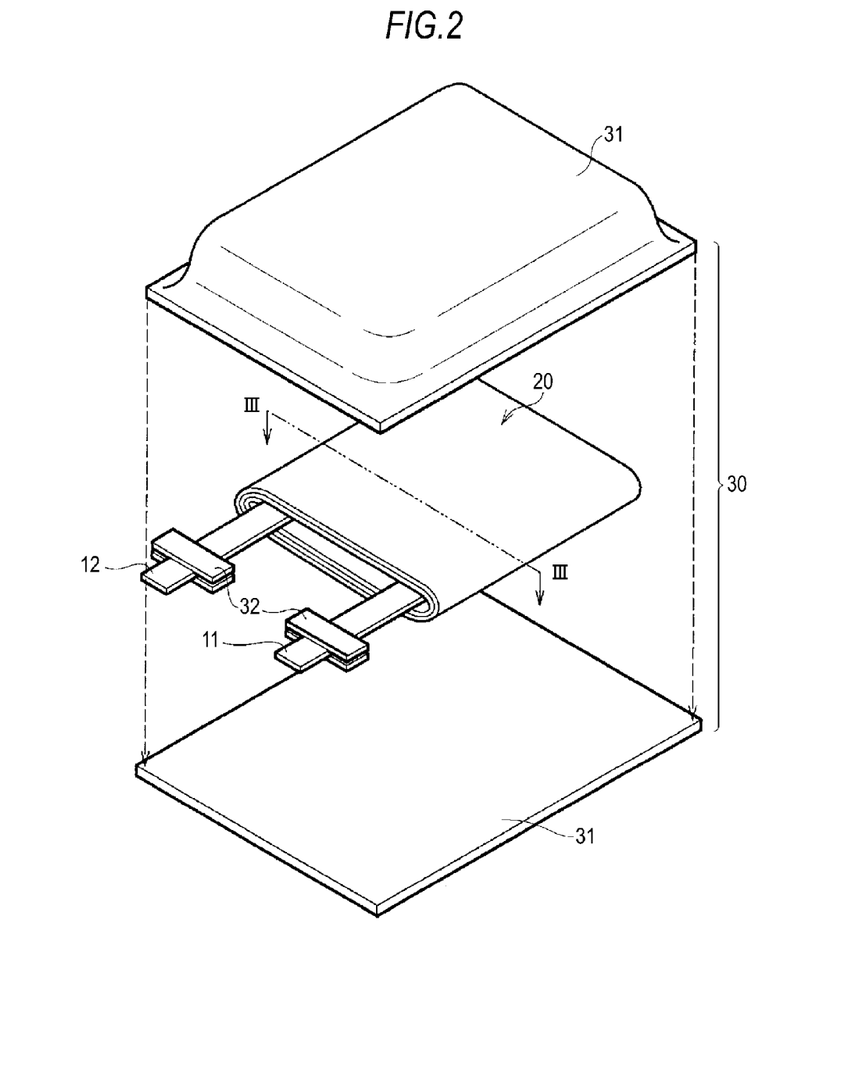
FIG. 2 is an exploded perspective view showing an example of a nonaqueous electrolyte secondary battery according to a second embodiment.

FIG. 2 is an exploded perspective view showing an example of a nonaqueous electrolyte secondary battery according to a second embodiment. Such a nonaqueous electrolyte secondary battery is one called a laminate type battery.

As shown in FIG. 2, this nonaqueous electrolyte secondary battery is constituted such that a battery element 20 having a negative electrode lead 11 and a positive electrode lead 12 installed therein is enclosed in the inside of an exterior member 30.

The negative electrode lead 11 and the positive electrode lead 12 are led out from the inside toward the outside of the exterior member 30 in, for example, the same direction, respectively.

Each of the negative electrode lead 11 and the positive electrode lead 12 is, for example, constituted of a metal material such as aluminum (Al), copper (Cu), nickel (Ni) and stainless steel.

A material obtained by eliminating an electrolyte from the battery element 20 is referred to as a electrode body.

Exterior Member

The exterior member 30 is, for example, constituted of a rectangular laminated film 31 prepared by sticking a nylon film, an aluminum foil and a polyethylene film in this order. The exterior member 30 is, for example, disposed such that the polyethylene film side thereof and the battery element 20 are opposed to each other, and respective outer peripheries are joined to each other by means of fusion or with an adhesive.

A contact film 32 is inserted between the exterior member 30 and each of the negative electrode lead 11 and the positive electrode lead 12 for the purpose of preventing invasion of the outside air from occurring. The contact film 32 is constituted of a material having adhesion to each of the negative electrode lead 11 and the positive electrode lead 12, and for example, in the case where each of the negative electrode lead 11 and the positive electrode lead 12 is constituted of the foregoing metal material, it is preferable that the contact film 32 is constituted of a polyolefin resin such as polyethylene, polypropylene, modified polyethylene and modified polypropylene.

The exterior member 30 may also be constituted of a laminated film having other structure, for example, a metal material-free laminated film, a film of a polymer such as polypropylene, a metal film or the like, in place of the foregoing laminated film.

Here, a general constitution of the laminated film can be represented by a laminated structure of (exterior layer)/(metal foil)/(sealant layer) (however, there may be the case where each of the exterior layer and the sealant layer is constituted of plural layers). In the foregoing example, the nylon film is corresponding to the exterior layer; the aluminum foil is corresponding to the metal foil; and the polyethylene film is corresponding to the sealant layer.

The metal foil is enough to function as a moisture permeation resistant barrier film, and not only an aluminum foil but a stainless steel foil, a nickel foil, a plated iron foil and the like can be used. Of these, an aluminum foil which is thin, light-weight and excellent in processability can be suitably used.

When a constitution which can be used as the exterior member is enumerated in a mode of (exterior layer)/(metal foil)/(sealant layer), there are exemplified Ny (nylon)/Al (aluminum)/CPP (cast polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low density polyethylene), PET/PE/Al/PET/LDPE (low density polyethylene) and PET/Ny/Al/LDPE/CPP.

Constitution of Battery Element

Figure 3:
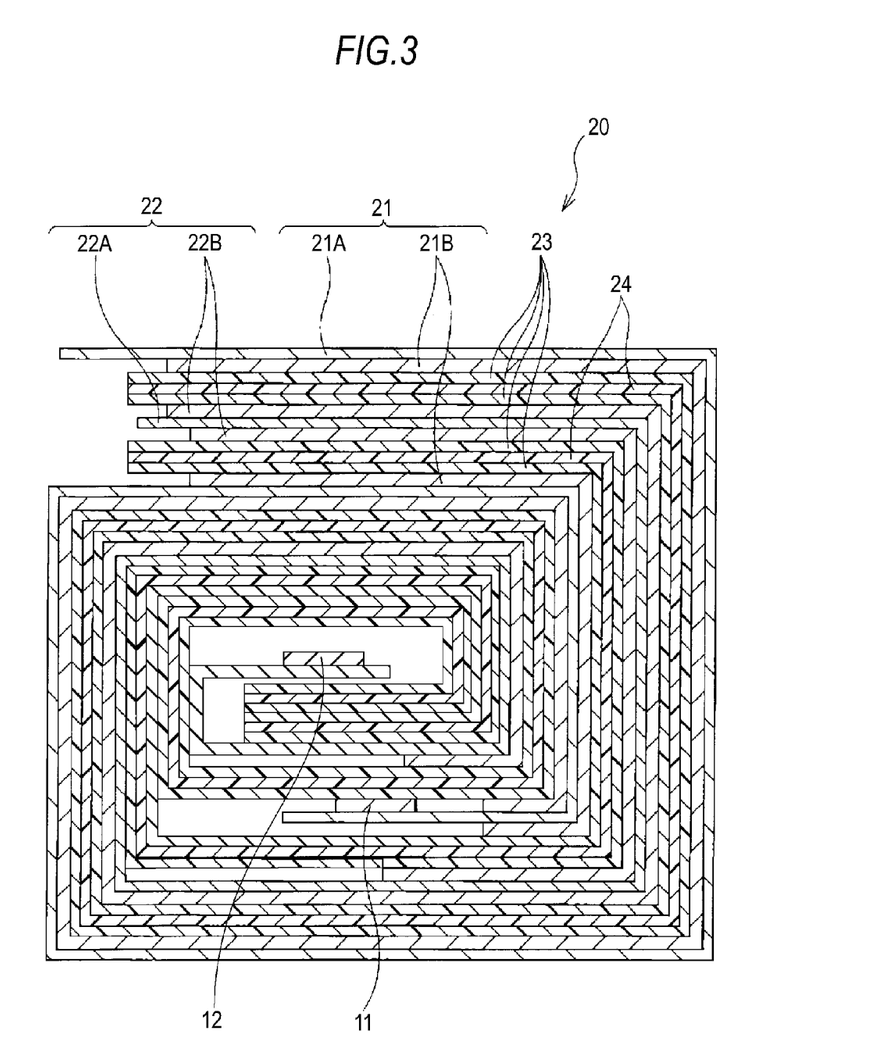
FIG. 3 is a schematic sectional view along an line of a battery element shown in FIG. 2.

FIG. 3 is a schematic sectional view along an line of the battery element 20 shown in FIG. 2. In FIG. 3, in the battery element 20, a negative electrode 21 and a positive electrode 22 are located opposing to each other via a separator 24 having a polymer support layer 23 formed on the both surfaces thereof and wound. The polymer support layer 23 holds an electrolytic solution between the negative electrode 21 and the positive electrode 22 to form an electrolyte layer. Also, while illustration is omitted, a polymer support layer or a separator which is present without being interposed between the negative electrode 21 and the positive electrode 22 may be energized and compressed during winding. According to this, the electrolyte layer can be formed at a more desirable position.

While illustration is omitted, an outermost peripheral part thereof may be protected by a protective tape.

Negative Electrode

Since the negative electrode has been described in the first embodiment, its explanation is omitted.

Positive Electrode

On the contrary, similar to the negative electrode 21, the positive electrode 22 has, for example, a structure in which a positive electrode active material layer 22B is covered on the both surfaces or one surface of a positive electrode collector 22A having a pair of surfaces opposing to each other. The positive electrode collector 22A includes an exposed portion without being covered by the positive electrode active material layer 22B in one end in a longitudinal direction thereof, and the positive electrode lead 12 is installed in this exposed portion.

The positive electrode collector 22A is, for example, constituted of a metal foil such as an aluminum foil, a nickel foil and a stainless steel foil.

The positive electrode active material layer 22B contains, as a positive electrode active material, any one kind or two or more kinds of a positive electrode material capable of intercalating and deintercalating a lithium ion and may further contain a conductive agent such as graphite and a binder such as polyvinylidene fluoride, if desired.

Also, carboxymethyl cellulose (CMC) or a rubber based binder such as a styrene butadiene rubber (SBR) may be used as the binder.

Examples of the positive electrode material capable of intercalating and deintercalating a lithium ion include sulfur (S); lithium-free chalcogenides (especially, layered compounds and spinel type compounds), for example, disulfides such as iron disulfide ($FeS_2$), titanium disulfide ($TiS_2$) and molybdenum disulfide ($MoS_2$), niobium diselenide ($NbSe_2$), vanadium oxide ($V_2O_5$), titanium dioxide ($TiO_2$) and manganese dioxide ($MnO_2$); lithium-containing compounds containing lithium therein; and conductive polymer compounds, for example, polyaniline, polythiophene, polyacetylene and polypyrrole.

Of these, lithium-containing compounds are preferable because they include a compound capable of obtaining high voltage and high energy density. Examples of such a lithium-containing compound include complex oxides containing lithium and a transition metal element; and phosphate compounds containing lithium and a transition metal. From the viewpoint of obtaining a higher voltage, those containing cobalt (Co), nickel (Ni), manganese (Mn), iron (Fe), copper (Cu), zinc (Zn), chromium (Cr), vanadium (V), titanium (Ti) or an arbitrary mixture thereof are especially preferable.

Such a lithium-containing compound is representatively represented by the following general formula (5) or (6):

$$Li_x M^I O_2 \quad (5)$$

$$Li_y M^{II} PO_4 \quad (6)$$

In the formulae (5) and (6), each of $M^I$ and $M^{II}$ represents one or more kinds of a transition metal element; and values of x and y vary depending upon the charge and discharge state of the battery and are usually satisfied with the relationships of $(0.05 \leq x \leq 1.10)$ and $(0.05 \leq y \leq 1.10)$, respectively. The compound of the formula (5) generally has a layered structure; and the compound of the formula (6) generally has an olivine structure.

Also, specific examples of the complex oxide containing lithium and a transition metal element include a lithium cobalt complex oxide ($Li_x CoO_2$); a lithium nickel complex oxide ($LiNiO_2$) and a solid solution thereof ($Li(Ni_x Co_y Mn_z)O_2$); a lithium nickel cobalt complex oxide ($LiNi_{1-z} Co_z O_2$ (z 1)); and a lithium manganese complex oxide having a spinel type structure ($LiMn_2 O_4$) and a solid solution thereof ($Li(Mn_{2-x} Ni_y)O_4$).

Specific examples of the phosphate compound containing lithium and a transition metal element include a lithium iron phosphate compound having an olivine structure ($LiFePO_4$) and a lithium iron manganese phosphate compound ($LiFe_{1-v} Mn_v PO_4$ (v 1)).

Separator

Also, the separator 24 is, for example, constituted of an insulating thin film having large ion permeability and prescribed mechanical strength, such as a porous film composed of a polyolefin based synthetic resin (for example, polypropylene, polyethylene, etc.) and a porous film composed of an inorganic material (for example, a ceramic-made nonwoven fabric, etc.), and may have a structure in which two or more kinds of such a porous film are laminated. In particular, one including a polyolefin based porous film is suitable because it is excellent in separability between the negative electrode 21 and the positive electrode 22 and is able to more reduce an internal short circuit or a lowering of an open-circuit voltage.

Nonaqueous Solvent

A variety of high-dielectric solvents and low-viscosity solvents can be used as the nonaqueous solvent.

As the high-dielectric solvent, a solvent containing ethylene carbonate can be exemplified as a preferred example, but it should not be construed that the high-dielectric solvent is limited thereto.

Examples of the high-dielectric solvent include cyclic carbonates such as propylene carbonate, butylene carbonate and vinylene carbonate.

Also, a solvent obtained by substituting hydrogen of such a cyclic carbonate with a halogen or other solvent may be added and used. Specific examples thereof include cyclic carbonates such as 4-fluoro-1,3-dioxolan-2-one(fluoroethylene carbonate (FEC)), 4,5-difluoro-1,3-dioxolan-2-one (difluoroethylene carbonate (DFEC)), 4-chloro-1,3-dioxolan-2-one (chloroethylene carbonate) and trifluoromethylethylene carbonate. With regard to DFEC, trans-DFEC is particularly preferable.

Also, as the high-dielectric solvent, there can be used lactones such as γ-butyrolactone and γ-valerolactone; lactams such as N-methylpyrrolidone; cyclic carbamates such as N-methyloxazolidinone; sulfone compounds such as tetramethylene sulfone; and the like in place of or together with the cyclic carbonate.

On the contrary, preferred examples of the low-viscosity solvent include a solvent containing diethyl carbonate, but it should not be construed that the low-viscosity solvent is limited thereto. Examples thereof include chain carbonates such as dimethyl carbonate, ethyl methyl carbonate and methyl propyl carbonate; chain carboxylates such as methyl acetate, ethyl acetate, methyl propionate, ethyl propionate, methyl butyrate, methyl isobutyrate, methyl trimethylacetate and ethyl trimethylacetate; chain amides such as N,N-dimethylacetamide; chain carbamates such as methyl N,N-diethylcarbamate and ethyl N,N-diethylcarbomate; and ethers such as 1,2-dimethoxyethane, tetrahydrofuran, tetrahydropyran and 1,3-dioxolane.

The foregoing high-dielectric solvent and low-viscosity solvent can be used singly or as an arbitrary mixture of two or more kinds thereof Also, a content of the nonaqueous solvent is preferably from 70 to 90% by mass. When the content of the nonaqueous solvent is less than 70% by mass, there is a concern that the viscosity excessively increases, whereas when it exceeds 90% by mass, there is a concern that it may be impossible to obtain sufficient conductivity.

Electrolyte Salt

As the electrolyte salt, any material may be used so far as it is dissolved or dispersed in the foregoing nonaqueous solvent to generate an ion, and a material containing lithium hexafluorophosphate ($LiPF_6$) can be suitably used. However, needless to say, it should not be construed that the electrolyte salt is limited thereto.

For example, inorganic lithium salts such as lithium tetrafluoroborate ($LiBF_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$); lithium salts of perfluoroalkanesulfonic acid derivatives such as lithium trifluoromethanesulfonate ($LiCF_3 SO_3$), lithium bis(trifluoromethanesulfone)imide ($LiN(CF_3 SO_2)_2$), lithium bis(pentafluoroethanesulfone)methide ($LiC(C_2 F_5 SO_2)_2$) and lithium tris(trifluoromethanesulfone)methide ($LiC(CF_3 SO_2)_3$); and the like may be used. These lithium salts can be used singly or as an arbitrary mixture of two or more kinds thereof.

A content of such an electrolyte salt is preferably from 0.5 to 2.0 moles/kg. When the content of the electrolyte salt is less than 0.5 moles/kg, there is a concern that it may be impossible to obtain sufficient conductivity, whereas when it exceeds 2.0 moles/kg, there is a concern that the viscosity excessively increases.

Isocyanate Compound

Also, the electrolyte salt may further contain an isocyanate compound. As such an isocyanate compound, those described in the first embodiment can be applied, and since the isocyanate compound has been described in the first embodiment, its explanation is omitted.

A content of the isocyanate compound is preferably from 0.01 to 5 parts by weight based on 100 parts by weight of the nonaqueous solvent. When the content of the isocyanate compound falls within the foregoing range, the isocyanate compound is easily dissolved in the electrolytic solution, and a blister-suppressing effect is easily revealed. Such a value is effective in a state before a heat pressing step as described later. In the heat pressing step as described later, a solid electrolyte interface coating (SEI) is formed on the active material of the electrode (chiefly, the negative electrode), and a part of the isocyanate compound is consumed. Thus, it may be considered that the amount and concentration of the isocyanate compound in the electrolytic solution become different values to some extent at the time of use.

Polymer Support

The polymer support forms a layered structure and is impregnated with or holds an electrolytic solution to form an electrolyte layer.

The occurrence of liquid leakage of the electrolytic solution in the obtained battery can be effectively suppressed due to swelling in such a polymer support or gelation or non-fluidization of the electrolytic solution.

Examples of a polymer capable of forming such a polymer support include polyvinyl formal (7), a polyacrylate (8) and polyvinylidene fluoride (PVdF) (9) represented by the following chemical formulae (7) to (9), respectively.

(7)

In the formula (7), N represents a degree of polymerization and is preferably from 100 to 10,000. When N is less than 100, gelation is not sufficient, whereas when N exceeds 10,000, there is a concern that a viscosity is large so that a capacity is lowered.

(8)

In the formula (8), R represents $C_nH_{2n-1}O_m$ (wherein n represents an integer of from 1 to 8, and m represents an integer of from 0 to 4); and N represents a degree of polymerization and is preferably from 100 to 10,000. When N is less than 100, gelation is difficult, whereas when N exceeds 10,000, there is a concern that fluidity is reduced.

(9)

In the formula (9), N represents a degree of polymerization and is preferably from 100 to 10,000. When N is less than 100, gelation is not sufficient, whereas when N exceeds 10,000, there is a concern that a viscosity is large so that a capacity is lowered.

A content of the foregoing polymer compound is preferably from 0.1 to 5 parts by weight based on 100 parts by weight of the electrolytic solution. When the content of the polymer compound is less than 0.1 parts by weight, gelation is difficult, whereas when it exceeds 5 parts by weight, there is a concern that fluidity is reduced.

The polymer support is not limited to the foregoing compounds so far as it is able to impregnate or hold the foregoing nonaqueous solvent and the foregoing electrolyte salt. That is, for example, copolymers or multi-component copolymers containing, as a constituent component, vinylidene fluoride, hexafluoropropylene, polytetrafluoroethylene or the like can also be applied. Specific examples thereof include a polyvinylidene fluoride-hexafluoropropylene copolymer (PVdF-HFP) and a polyvinylidene fluoride-hexafluoropropylene-chlorotrifluoroethylene copolymer (PVdF-HFP-CTFE).

3. Third Embodiment

Preparation of Nonaqueous Electrolyte Secondary Battery

An example of a manufacturing method of the nonaqueous electrolyte secondary battery according to the first embodiment is described. Since respective constituent elements in the third embodiment are the same as the respective constituent elements in the second embodiment, explanation thereof is omitted.

First of all, the negative electrode 21 is prepared. For example, in the case of using a granular negative electrode active material, the negative electrode active material is mixed with a conductive agent and a binder, if desired, to prepare a negative electrode mixture, which is then dispersed in a dispersion medium such as N-methyl-2-pyrrolidone to prepare a negative electrode mixture slurry. Thereafter, this negative electrode mixture slurry is coated on the negative electrode collector 21A, dried and then compression molded to form the negative electrode active material layer 21B. The formation of a solid electrolyte interface coating on the negative electrode active material is carried out later.

Also, the positive electrode 22 is prepared. For example, in the case of using a granular positive electrode active material, the positive electrode active material is mixed with a conductive agent and a binder, if desired, to prepare a positive electrode mixture, which is then dispersed in a dispersion medium such as N-methyl-2-pyrrolidone to prepare a positive electrode mixture slurry.

Subsequently, this positive electrode mixture slurry is coated on the positive electrode collector 22A, dried and then compression molded to form the positive electrode active material layer 22B.

Subsequently, not only the negative electrode lead 11 is installed in the negative electrode 21, but also the positive electrode lead 12 is installed in the positive electrode 22. Thereafter, the negative electrode 21, the separator 24 having the polymer support layer 23 formed on the both surfaces thereof, the positive electrode 22 and the separator 24 having the polymer support layer 23 formed on the both surfaces thereof are successively laminated and wound, and a protective tape is bonded to an outermost peripheral part of the wound laminate, thereby forming a wound electrode body. Furthermore, this wound electrode body is interposed between laminated films 31 as an example of the exterior member 30, and the outer edges exclusive of one side are subjected to heat fusion to form a bag.

Thereafter, the electrolytic solution containing a nonaqueous solvent, an electrolyte salt and an isocyanate compound is injected into the inside of the wound electrode body from an opening of the laminated film 31, and the opening of the laminated film is then subjected to heat fusion and enclosed therein. Also, heat pressing for heating and pressing the enclosed electrode body and electrolyte is carried out.

According to this, the isocyanate group of the isocyanate compound existing in the electrolytic solution penetrates into a region of at least 50% of a thickness from the surface of the negative electrode active material layer and reacts with a hydroxyl group or moisture existing in the electrode mixture such as a negative electrode active material, thereby forming a solid electrolyte interface coating (SEI).

By passing through the heat pressing step, the electrolytic solution penetrates into the inside of the electrode, and furthermore, the reaction of the isocyanate compound is accelerated, whereby the interface coating derived from the isocyanate compound is formed over the inside of the electrode.

As compared with interface coatings which have hitherto been formed by means of charge and discharge, such an interface coating is able to effectively suppress the generation of a gas to be caused due to decomposition of a carbonate at the time of high-temperature storage, and a very large blister-suppressing effect can be obtained.

Also, at that time, the electrolytic solution is held by the polymer support layer 23 to form an electrolyte layer, whereby the nonaqueous electrolyte secondary battery shown in FIGS. 2 and 3 is accomplished.

In the heat pressing step, it is preferable that the treatment is carried out at a heating temperature in the range of from 40° C. to 110° C. When the heating temperature is lower than 40° C., an effect for accelerating impregnation of the electrolytic solution is poor, and there is a concern that the isocyanate group does not react on the surface of the active material. Also, when the heat pressing is carried out at a temperature exceeding 110° C., there is a concern that micro pores of the separator are closed, whereby, for example, the transfer of a lithium ion is impaired.

Also, in the heat pressing step, it is preferable that its pressing pressure is from 0.05 MPa to 10 MPa. When the pressing pressure is less than 0.05 MPa, an effect for accelerating the impregnation is poor. On the contrary, when the pressing pressure exceeds 10 MPa, the electrolytic solution flows out between the electrode body and the exterior member from the inside of the electrode body, whereby the impregnation is rather impaired.

On the contrary, when after the injection, only heating step is carried out, an interface coating is formed only on the surface of the electrode having an electrolytic solution impregnated therein, and an interface coating derived from the isocyanate compound is not formed in a deep non-impregnated site of the electrode.

Explanation of Action

In the nonaqueous electrolyte secondary battery which has been described above, when charged, a lithium ion is deintercalated from the positive electrode active material layer 22B and intercalated into the negative electrode active material layer 21B via the electrolyte layer. When discharged, a lithium ion is deintercalated from the negative electrode active material layer 21B and intercalated into the positive electrode active material layer 22B via the electrolyte layer.

EXAMPLES

The present application is hereunder described in more detail with reference to the following Examples and Comparative Examples, but it should not be construed that the present application is limited to only these Examples and Comparative Examples.

Specifically, the nonaqueous electrolyte secondary battery shown in FIGS. 2 and 3 was prepared, and performances thereof were evaluated.

Examples 1-1 to 1-6

First of all, 94 parts by weight of a lithium cobalt complex oxide ($LiCoO_2$) as a positive electrode active material, 3 parts by weight of graphite as a conductive agent and 3 parts by weight of polyvinylidene fluoride (PVdF) as a binder were uniformly mixed, and N-methylpyrrolidone was added to the mixture to obtain a positive electrode mixture coating solution. Subsequently, the obtained positive electrode mixture coating solution was uniformly coated on the both surfaces of a 10 μm-thick aluminum foil serving as a positive electrode collector and dried to form a positive electrode mixture layer (volume density of the mixture: 3.40 g/cm$^3$) having a thickness of 30 μm per surface. This was cut into a shape having a size of 50 mm in width and 300 mm in length, thereby preparing a positive electrode.

Subsequently, 97 parts by weight of mesocarbon microbead (MCMB) based graphite as a negative electrode active material and 3 parts by weight of PVdF as a binder were uniformly mixed, and N-methylpyrrolidone was added to the mixture to obtain a negative electrode mixture coating solution. Subsequently, the obtained negative electrode mixture coating solution was uniformly coated on the both surfaces of a 10 μm-thick copper foil serving as a negative electrode collector, dried and then pulverized under 200 MPa to form a negative electrode mixture layer (volume density of the mixture: 1.80 g/cm$^3$) having a thickness of 30 μm per surface. This was cut into a shape having a size of 50 mm in width and 300 mm in length, thereby preparing a negative electrode.

As to an electrolytic solution, a mixed solvent obtained by mixing ethylene carbonate (EC) and diethyl carbonate (DEC) was used as a solvent; lithium hexafluorophosphate ($LiPF_6$) was used as an electrolyte salt; and 1-isocyanatohexane ($C_6H_{13}NCO$) (Example 1-1), 1-isocyanatooctane ($C_8H_{17}NCO$) (Example 1-2), 1-isocyanatododecane ($C_{12}H_{25}NCO$) (Example 1-3) and 1-isocyanatooctadecane ($C_{18}H_{37}NCO$) (Example 1-4) were used, respectively as an isocyanate compound represented by the general formula (1), and methylene bis(4,1-cyclohexylene)diisocyanate (OCN($C_6H_{10}$)$CH_2$($C_6H_{10}$)NCO) (Example 1-5) and methylene bis(4,1-phenylene)diisocyanate (OCN($C_6H_4$)$CH_2$($C_6H_4$)NCO) (Example 1-6) were used, respectively as an isocyanate compound represented by the general formula (4).

On that occasion, a composition of the mixed solvent was regulated to EC/DEC=40/60 in terms of a weight ratio, and a concentration of $LiPF_6$ in the electrolytic solution was regulated to 1 mole/kg. Also, an addition amount of each of the isocyanate compounds was regulated to 0.5 parts by weight based on 100 parts by weight of the nonaqueous solvent.

As a separator, a material obtained by coating polyvinylidene fluoride in a thickness of 2 μm on the both sides of a microporous polyethylene film having a thickness of 7 μm.

The positive electrode and the negative electrode were laminated and wound via the separator, and then put in a bag made of an aluminum laminated film. After injecting 2 g of the electrolytic solution into this bad, the bag was subjected to heat fusion by means of heat pressing at a heating temperature of 80° C. under a pressing pressure of 1.5 MPa for 100 seconds, thereby preparing a laminate type battery. Each of the batteries had a capacity of 800 mAh.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 1. The blister after storage was calculated according to an expression: [blister after storage (mm)=(thickness after storage)−(thickness before storage)].

While all of the respective isocyanate compounds exhibited a blister-suppressing effect after storage, the results revealed that the larger the carbon atom number of the main chain is, the larger the blister-suppressing effect over a long period of time is. It may be considered that by extending the alkyl chain, a difference in interface coating solubility appeared. Also, according to the comparison between the alicyclic hydrocarbon group of methylene bis(4,1-cyclohexylene)diisocyanate and the aromatic hydrocarbon group of methylene bis(4,1-phenylene)diisocyanate, it is noted that the alicyclic hydrocarbon group is larger in the blister-suppressing effect after storage and more favorable in the discharge capacity retention rate after repeated charge and discharge. It may be considered that this was caused due to the fact that in the case where an aromatic group is present on the main chain, a high-resistance SEI is formed, and stability of the SEI itself is worse.

blister when stored at 85° C. for 5 hours and 96 hours, respectively in a charged state with 4.2 V are shown in Table 1.

Comparative Example 1-8

A laminate type battery was prepared in the same manner as in Example 1-1, except that the isocyanate compound was not added.

A retention rate of this battery to an initial discharge capacity after repeating charge with 800 mA in an atmosphere at

TABLE 1

| | Heat pressing condition | | Isocyanate compound | | Discharge capacity retention rate (%) | Blister after storage at 85° C. for 5 hours (mm) | Blister after storage at 85° C. for 96 hours (mm) |
|---|---|---|---|---|---|---|---|
| | Temperature (° C.) | Pressure (MPa) | Kind | Addition amount (part by weight) | | | |
| Example 1-1 | 80 | 1.5 | 1-Isocyanatohexane | 0.5 | 72 | 0.46 | 4.03 |
| Example 1-2 | | | 1-Isocyanatooctane | | 73 | 0.37 | 2.27 |
| Example 1-3 | | | 1-Isocyanatododecane | | 75 | 0.28 | 1.34 |
| Example 1-4 | | | 1-Isocyanatooctadecane | | 78 | 0.10 | 0.73 |
| Example 1-5 | | | Methylene bis(4,1-cyclo-hexylene) diisocyanate | | 77 | 0.30 | 1.31 |
| Example 1-6 | | | Methylene bis(4,1-phenylene) diisocyanate | | 66 | 0.53 | 2.58 |
| Comparative Example 1-1 | — | — | 1-Isocyanatohexane | 0.5 | 72 | 0.98 | 4.41 |
| Comparative Example 1-2 | | | 1-Isocyanatooctane | | 74 | 0.81 | 3.84 |
| Comparative Example 1-3 | | | 1-Isocyanatododecane | | 74 | 0.61 | 2.23 |
| Comparative Example 1-4 | | | 1-Isocyanatooctadecane | | 77 | 0.54 | 1.73 |
| Comparative Example 1-5 | | | Methylene bis(4,1-cyclo-hexylene) diisocyanate | | 76 | 0.73 | 2.03 |
| Comparative Example 1-6 | | | Methylene bis(4,1-phenylene) diisocyanate | | 71 | 1.12 | 3.46 |
| Comparative Example 1-7 | — | — | — | — | 75 | 1.32 | 4.21 |
| Comparative Example 1-8 | 80 | 1.5 | — | — | 77 | 1.34 | 3.87 |
| Comparative Example 1-9 | | | 1,4-Diisocyanatobutane | 0.5 | 70 | 0.56 | 5.1 |
| Comparative Example 1-10 | | | 1,6-Diisocyanatohexane | 0.5 | 72 | 0.42 | 4.31 |

Comparative Examples 1-1 to 1-6

Laminate type batteries were prepared in the same manner as in Examples 1-1 to 1-6, except that each of the batteries was prepared without carrying out the heat pressing step after injection of the electrolytic solution. Isocyanate compounds used in Comparative Examples 1-1 to 1-6 are shown in Table 1.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 1.

Comparative Example 1-7

A laminate type battery was prepared in the same manner as in Comparative Example 1-1, except that the isocyanate compound was not added.

A retention rate of this battery to an initial discharge capacity after repeating charge with 800 mA in an atmosphere at 23° C. for 3 hours while regulating an upper limit to 4.2 V and subsequent discharge to 3.0 V at 800 mAh 300 times and 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 1.

In the light of the above, in the case of the nonaqueous electrolyte secondary battery not containing an isocyanate compound, even when the heat pressing is carried out, a blister-suppressing behavior is not observed at all. Also, in the nonaqueous electrolyte secondary battery having been subjected to a heat pressing step after injecting an isocyanate compound-containing electrolytic solution, its blister-suppressing effect becomes remarkably large as compared with the battery which is not subjected to a heat pressing step after injecting an isocyanate compound-containing electrolytic solution.

Comparative Example 1-9

A laminate type battery was prepared in the same manner as in Example 1-1, except for using an electrolytic solution composition containing 1,4-diisocyanatobutane (BDI) in place of the 1-isocyanatohexane.

A retention rate of this battery to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 1.

Comparative Example 1-10

A laminate type battery was prepared in the same manner as in Example 1-1, except for using an electrolytic solution composition containing 1,6-diisocyanatohexane (HDI) in place of the 1-isocyanatohexane.

A retention rate of this battery to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 1.

In the light of the above, in comparison between Examples 1-1 to 1-6 and Comparative Examples 1-9 and 1-10, the results revealed that when BDI, HDI or 1-isocyanatohexane with a small carbon atom number is used, though the blister at the initial stage of storage is suppressed, the blister at the time of long-term storage is rather expanded. It may be considered that this is caused due to the fact that in an interface coating with a small carbon atom number, a polar group of —NCO strongly acts to have a good affinity with the electrolytic solution, and hence, such an interface coating is dissolved in the electrolytic solution after high-temperature storage over a long period of time, and the electrolytic solution is decomposed by the exposed negative electrode active material to generate a gas.

On the contrary, it is noted that in the battery using an isocyanate compound in which the carbon atom number of an alkyl group is increased, or an alicyclic hydrocarbon is contained in the main chain, the blister at the time of long-term storage can be suppressed. The interface coating whose carbon atom number is increased to some extent becomes large in hydrophobicity and is hardly dissolved in the electrolytic solution even at a high temperature, and even when stored over a long period of time, it suppresses the reaction between the electrolytic solution and the negative electrode.

In the light of the above, in view of the fact that an isocyanate compound with a small carbon atom number is accompanied with dissolution in the electrolytic solution at the time of a high temperature and accelerates decomposition of the electrolytic solution, it may be considered that the isocyanate compound taking a structure in which the main chain is hardly dissolved in the electrolytic solution, such as 1-isocyanatododecane, 1-isocyanatooctadecane and methylene bis (4,1-cyclohexylene)diisocyanate is effective for suppressing blister after long-term storage.

Examples 2-1 to 2-5

Laminate type batteries were prepared in the same manner as in Example 1-4, except for using the addition amount of the isocyanate compound shown in Table 2.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 2.

TABLE 2

| | Heat pressing condition | | Isocyanate compound | | Discharge capacity retention rate (%) | Blister after storage at 85° C. for 5 hours (mm) | Blister after storage at 85° C. for 96 hours (mm) |
|---|---|---|---|---|---|---|---|
| | Temperature (° C.) | Pressure (MPa) | Kind | Addition amount (part by weight) | | | |
| Example 2-1 | 80 | 1.5 | 1-Isocyanatooctadecane | 0.02 | 75 | 1.26 | 4.23 |
| Example 2-2 | | | | 0.05 | 76 | 0.95 | 3.01 |
| Example 1-4 | | | | 0.5 | 78 | 0.10 | 0.73 |
| Example 2-3 | | | | 2 | 77 | 0.07 | 0.63 |
| Example 2-4 | | | | 5 | 70 | 0.04 | 0.43 |
| Example 2-5 | | | | 10 | 58 | 0.02 | 0.27 |
| Example 2-6 | | | Methylene bis(4,1-cyclohexylene) diisocyanate | 0.02 | 76 | 1.21 | 4.31 |
| Example 2-7 | | | | 0.05 | 75 | 0.90 | 3.15 |
| Example 1-5 | | | | 0.5 | 78 | 0.30 | 1.31 |
| Example 2-8 | | | | 2 | 77 | 0.21 | 0.89 |
| Example 2-9 | | | | 5 | 63 | 0.15 | 0.65 |
| Example 2-10 | | | | 10 | 43 | 0.10 | 0.42 |
| Comparative Example 1-7 | — | — | — | — | 75 | 1.32 | 4.21 |
| Comparative Example 2-1 | | | 1-Isocyanatooctadecane | 0.02 | 75 | 1.29 | 4.05 |
| Comparative Example 2-2 | | | | 0.05 | 74 | 1.11 | 3.62 |
| Comparative Example 1-4 | | | | 0.5 | 77 | 0.54 | 1.73 |
| Comparative Example 2-3 | | | | 2 | 64 | 0.29 | 0.89 |
| Comparative Example 2-4 | | | | 5 | 55 | 0.20 | 0.72 |
| Comparative Example 2-5 | | | | 10 | 34 | 0.12 | 0.53 |
| Comparative Example 2-6 | | | Methylene bis(4,1-cyclohexylene) diisocyanate | 0.02 | 75 | 1.30 | 4.18 |
| Comparative Example 2-7 | | | | 0.05 | 74 | 1.21 | 3.53 |
| Comparative Example 1-5 | | | | 0.5 | 76 | 0.73 | 2.03 |
| Comparative Example 2-8 | | | | 2 | 64 | 0.35 | 1.05 |
| Comparative Example 2-9 | | | | 5 | 48 | 0.30 | 0.8 |
| Comparative Example 2-10 | | | | 10 | 27 | 0.23 | 0.62 |

Examples 2-6 to 2-10

Laminate type batteries were prepared in the same manner as in Example 1-5, except for using the addition amount of the isocyanate compound shown in Table 2.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 2.

Comparative Examples 2-1 to 2-5

Laminate type batteries were prepared in the same manner as in Comparative Example 1-4, except for using the addition amount of the isocyanate compound shown in Table 2.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 2.

From Table 2, it is noted that when the addition amount of the isocyanate compound reaches 0.05 parts by weight, a blister-suppressing behavior at the time of high-temperature storage is observed, and the blister-suppressing effect is enhanced with an increase of the addition amount of the isocyanate compound based on 100 parts by weight of the Comparative Examples 2-6 to 2-10

Laminate type batteries were prepared in the same manner as in Comparative Example 1-5, except for using the addition amount of the isocyanate compound shown in Table 2.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 2.

Examples 3-1 to 3-5

Laminate type batteries were prepared in the same manner as in Example 1-4, except for changing the heating temperature in the heat pressing step as shown in Table 3.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 3.

TABLE 3

| | Heat pressing condition | | Isocyanate compound | | Discharge capacity for 96 hours (mm) | Blister after storage at 85° C. for 5 hours (mm) | Blister after storage at 85° C. for 96 hours (mm) |
|---|---|---|---|---|---|---|---|
| | Temperature (° C.) | Pressure (MPa) | Kind | Addition amount (part by weight) | | | |
| Example 3-1 | 30 | 1.5 | 1-Isocyanatooctadecane | 0.5 | 79 | 0.53 | 1.75 |
| Example 3-2 | 40 | | | | 78 | 0.52 | 1.68 |
| Example 3-3 | 60 | | | | 77 | 0.23 | 1.25 |
| Example 1-4 | 80 | | | | 78 | 0.10 | 0.73 |
| Example 3-4 | 110 | | | | 72 | 0.12 | 0.81 |
| Example 3-5 | 120 | | | | 25 | 0.23 | 1.15 |
| Example 3-6 | 30 | 1.5 | Methylene bis(4,1-cyclohexylene) diisocyanate | 0.5 | 78 | 0.83 | 2.05 |
| Example 3-7 | 40 | | | | 77 | 0.68 | 1.85 |
| Example 3-8 | 60 | | | | 76 | 0.45 | 1.58 |
| Example 1-5 | 80 | | | | 78 | 0.30 | 1.31 |
| Example 3-9 | 110 | | | | 73 | 0.37 | 1.43 |
| Example 3-10 | 120 | | | | 32 | 0.52 | 1.62 |
| Comparative Example 3-1 | 30 | 1.5 | — | — | 75 | 1.41 | 4.28 |
| Comparative Example 3-2 | 40 | | | | 77 | 1.35 | 4.35 |
| Comparative Example 3-3 | 60 | | | | 76 | 1.28 | 4.23 |
| Comparative Example 1-7 | 80 | | | | 75 | 1.32 | 4.21 |
| Comparative Example 3-4 | 110 | | | | 69 | 1.42 | 4.31 |
| Comparative Example 3-5 | 120 | | | | 31 | 1.69 | 4.89 | nonaqueous solvent; and that when the addition amount of the isocyanate compound is less than 0.05 parts by weight, the blister-suppressing effect is not observed, whereas when the addition amount of the isocyanate compound exceeds 5 parts by weight, the charge and discharge characteristics are greatly impaired, and therefore, a favorable addition amount of the isocyanate compound is from 0.05 to 5 parts by weight based on 100 parts by weight of the nonaqueous solvent. Also, by carrying out a heat pressing step, the blister after storage is further suppressed without deteriorating the cycle characteristics. This is because by the heat pressing step, the electrolytic solution soaks into the details of the electrode simultaneously with the formation of an interface coating, whereby the interface coating is minutely on the surface of the active material.

Examples 3-6 to 3-10

Laminate type batteries were prepared in the same manner as in Example 1-5, except for changing the heating temperature in the heat pressing step as shown in Table 3.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 3.

In the light of the above, it may be considered that when the heating temperature is not higher than 40° C., the blister-suppressing effect at the time of storage is small so that the isocyanate group does not react at the time of heat pressing. On the contrary, when the heat pressing is carried out at a temperature exceeding 110° C., a large lowering of the discharge capacity retention rate is confirmed. It may be considered that this was caused due to the fact that since the heating temperature reaches a temperature corresponding to the initiation of shutdown of the separator, micropores of the separator are closed, whereby the transfer of a lithium ion is impaired.

Comparative Examples 3-1 to 3-5

Laminate type batteries were prepared in the same manner as in comparative Example 1-7, except for changing the heating temperature in the heat pressing step as shown in Table 3.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 3.

In the light of the above, in the case of a nonaqueous electrolyte secondary battery not containing an isocyanate compound, even when the temperature condition of the heat pressing is changed, a blister-suppressing behavior is not observed at all.

Examples 4-1 to 4-4

Laminate type batteries were prepared in the same manner as in Example 1-4, except for changing the pressing pressure in the heat pressing step as shown in Table 4.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 4.

In the light of the above, when the pressing pressure is not more than 0.05 MPa, the blister-suppressing effect at the time of storage is small as compared with that in a system where a load is appropriately applied. It may be considered that this was caused due to the fact that the pressing load for soaking the electrolytic solution into the details of the electrode was insufficient so that an interface coating could not be completely formed on the active material.

Also, when the pressing pressure is not less than 20 MPa, a lowering of the discharge capacity retention rate is caused. It may be considered that this was caused due to the fact that since the pressing load was too heavy, the electrolytic solution was squeezed out between the electrode body and the exterior member from the inside of the electrode body, whereby the impregnation was rather impaired.

Comparative Examples 4-1 to 4-4

Laminate type batteries were prepared in the same manner as in Comparative Example 1-7, except for changing the pressing pressure in the heat pressing step as shown in Table 4.

A retention rate of each of the batteries to an initial discharge capacity after repeating charge with 800 mA in an atmosphere at 23° C. for 3 hours while regulating an upper limit to 4.2 V and subsequent discharge to 3.0 V at 800 mAh 300 times and blister when stored at 85° C. for 5 hours and 96 hours, respectively in a charged state with 4.2 V are shown in Table 4.

In the light of the above, in the case of a nonaqueous electrolyte secondary battery not containing an isocyanate compound, even when the pressure condition of the heat

TABLE 4

| | Heat pressing condition | | Isocyanate compound | | Discharge capacity retention rate (%) | Blister after storage at 85° C. for 5 hours (mm) | Blister after storage at 85° C. for 96 hours (mm) |
| --- | --- | --- | --- | --- | --- | --- | --- |
| | Temperature (° C.) | Pressure (MPa) | Kind | Addition amount (part by weight) | | | |
| Example 4-1 | 80 | 0.05 | 1-Isocyanatooctadecane | 0.5 | 78 | 0.63 | 2.32 |
| Example 4-2 | | 0.5 | | | 77 | 0.15 | 1.98 |
| Example 1-4 | | 1.5 | | | 78 | 0.10 | 0.73 |
| Example 4-3 | | 10 | | | 75 | 0.13 | 0.81 |
| Example 4-4 | | 20 | | | 45 | 0.31 | 1.15 |
| Example 4-5 | 80 | 0.05 | Methylene bis(4,1-cyclohexylene) diisocyanate | 0.5 | 77 | 0.71 | 2.12 |
| Example 4-6 | | 0.5 | | | 76 | 0.38 | 1.48 |
| Example 1-5 | | 1.5 | | | 75 | 0.30 | 1.31 |
| Example 4-7 | | 10 | | | 73 | 0.37 | 1.38 |
| Example 4-8 | | 20 | | | 51 | 0.57 | 1.62 |
| Comparative Example 4-1 | 80 | 0.05 | — | — | 75 | 1.38 | 4.18 |
| Comparative Example 4-2 | | 0.5 | | | 77 | 1.41 | 4.32 |
| Comparative Example 1-7 | | 1.5 | | | 75 | 1.32 | 4.21 |
| Comparative Example 4-3 | | 10 | | | 74 | 1.33 | 4.29 |
| Comparative Example 4-4 | | 20 | | | 50 | 1.46 | 4.56 |

Examples 4-5 to 4-8

Laminate type batteries were prepared in the same manner as in Example 1-5, except for changing the pressing pressure in the heat pressing step as shown in Table 4.

A retention rate of each of the batteries to an initial discharge capacity after repeating charge with 800 mA in an atmosphere at 23° C. for 3 hours while regulating an upper pressing is changed, a blister-suppressing behavior is not observed at all. Moreover, when the heat pressing is carried out under a pressing pressure exceeding 10 MPa, a lowering of the discharge capacity retention rate is caused similar to Examples 4-4 and 4-8.

While the present application has been described with reference to a few of embodiments and working examples, it should not be construed that the present application is limited to the foregoing embodiments and working examples, but various modifications can be made within the gist of the present application.

For example, while in the foregoing embodiments, the case of a laminate type battery has been described, the present application is also applicable to the case of a rectangular battery.

Also, for example, in the foregoing embodiments, while the case where the battery element 20 having the negative electrode 21 and the positive electrode 22 laminated and wound therein is provided has been described, the present application is also applicable to the case where a plate-shaped battery element having a pair of a positive electrode and a negative electrode laminated therein or a battery element of a laminate type in which a plurality of positive electrodes and negative electrodes are laminated is provided.

Furthermore, as described previously, though the present application is concerned with a battery using lithium as an electrode reactant, the technical thought of the present application is also applicable to the case of using other alkali metal such as sodium (Na) and potassium (K), an alkaline earth metal such as magnesium (Mg) and calcium (Ca), or other light metal such as aluminum.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A negative electrode comprising:
a negative electrode collector; and
a negative electrode active material layer covering at least one principal plane of the negative electrode collector and containing at least a negative electrode active material, wherein:
a solid electrolyte interface coating is formed on a surface of the negative electrode active material layer and penetrates into a region from 50% to 80% of a thickness from the surface of the negative electrode active material layer such that the negative electrode active material contained in the region of 50% to 80% of the thickness from the surface of the negative electrode active material layer is covered with the solid electrolyte interface coating,
the solid electrolyte interface coating contains a product with a crosslinked isocyanate group in an isocyanate compound, and
the solid electrolyte interface coating exists on the surface of the negative electrode active material layer before an initial charge.

2. The negative electrode according to claim 1, wherein the isocyanate compound is at least one member selected from isocyanate compounds represented by the following general formulae (1) to (4)

(1)

wherein
N represents nitrogen; C represents carbon; O represents oxygen; and R1 represents a chain hydrocarbon group having from 1 to 22 carbon atoms or a chain hydrocarbon group having from 1 to 22 carbon atoms in which at least a part of carbons and/or hydrogens is substituted with at least one member selected from the group consisting of a halogen, oxygen, sulfur, nitrogen and silicon;

(2)

wherein
N represents nitrogen; C represents carbon; O represents oxygen; and R2 represents a chain hydrocarbon group having from 7 to 22 carbon atoms or a chain hydrocarbon group having from 1 to 22 carbon atoms in which at least a part of carbons and/or hydrogens is substituted with at least one member selected from the group consisting of a halogen, oxygen, sulfur, nitrogen and silicon;

(3)

wherein
N represents nitrogen; C represents carbon; O represents oxygen; and R3 represents a cyclic hydrocarbon group having from 6 to 20 carbon atoms or a cyclic hydrocarbon group having from 6 to 20 carbon atoms in which at least a part of carbons and/or hydrogens is substituted with at least one member selected from the group consisting of a halogen, oxygen, sulfur, nitrogen and silicon; and (4)

wherein
N represents nitrogen; C represents carbon; O represents oxygen; and R4 represents a cyclic hydrocarbon group having from 6 to 20 carbon atoms or a cyclic hydrocarbon group having from 6 to 20 carbon atoms in which at least a part of carbons and/or hydrogens is substituted with at least one member selected from the group consisting of a halogen, oxygen, sulfur, nitrogen and silicon.

3. The negative electrode according to claim 2, wherein the isocyanate compound represented by the general formula (1) is 1-isocyanatododecane and/or 1-isocyanatooctadecane.

4. The negative electrode according to claim 2, wherein the isocyanate compound represented by the general formula (4) is methylene bis(4,1-cyclohexylene)diisocyanate.

5. The negative electrode according to claim 1, wherein the negative electrode active material is a carbon material.

6. The negative electrode according to claim 1, wherein the solid electrolyte interface coating is formed by heat pressing the negative electrode and an electrolyte.

7. The negative electrode according to claim 6, wherein the heat pressing is performed at a pressure of 0.05 MPa to 10 MPa.

8. The negative electrode according to claim 1, wherein the solid electrolyte interface coating is derived from reaction of the isocyanate compound with a hydroxyl group or moisture existing within the negative electrode active material.

9. A nonaqueous electrolyte secondary battery comprising:
an electrode body having a positive electrode and a negative electrode wound or laminated via a separator;
an electrolyte containing a nonaqueous solvent and an electrolyte salt; and
an exterior member housing the electrode body and the electrolyte therein, wherein:
the negative electrode includes a negative electrode collector and a negative electrode active material layer covering at least one principal plane of the negative electrode collector and containing at least a negative electrode active material, a solid electrolyte interface coating is formed on a surface of the negative electrode active material layer and penetrates into a region from 50% to 80% of a thickness from the surface of the negative electrode active material layer such that the negative electrode active material contained in the region of 50% to 80% of the thickness from the surface of the negative electrode active material layer is covered with the solid electrolyte interface coating, the solid electrolyte interface coating contains a product with a crosslinked isocyanate group in an isocyanate compound, and the solid electrolyte interface coating exists on the surface of the negative electrode active material layer before an initial charge.

10. The nonaqueous electrolyte secondary battery according to claim 9, wherein the separator is a polymer support-provided separator in which at least one principal plane thereof is covered by a polymer support.

11. The nonaqueous electrolyte secondary battery according to claim 9, wherein the exterior member is a laminated film.

12. The nonaqueous electrolyte secondary battery according to claim 9, wherein the electrolyte further contains at least one member selected from isocyanate compounds represented by the following general formulae (1) to (4)

$$R^1\text{—}N\text{=}C\text{=}O \tag{1}$$

wherein

N represents nitrogen; C represents carbon; O represents oxygen; and R1 represents a chain hydrocarbon group having from 1 to 22 carbon atoms or a chain hydrocarbon group having from 1 to 22 carbon atoms in which at least a part of carbons and/or hydrogens is substituted with at least one member selected from the group consisting of a halogen, oxygen, sulfur, nitrogen and silicon;

$$O\text{=}C\text{=}N\text{—}R^2\text{—}N\text{=}C\text{=}O \tag{2}$$

wherein

N represents nitrogen; C represents carbon; O represents oxygen; and R2 represents a chain hydrocarbon group having from 7 to 22 carbon atoms or a chain hydrocarbon group having from 1 to 22 carbon atoms in which at least a part of carbons and/or hydrogens is substituted with at least one member selected from the group consisting of a halogen, oxygen, sulfur, nitrogen and silicon;

$$R^3\text{—}N\text{=}C\text{=}O \tag{3}$$

wherein

N represents nitrogen; C represents carbon; O represents oxygen; and R3 represents a cyclic hydrocarbon group having from 6 to 20 carbon atoms or a cyclic hydrocarbon group having from 6 to 20 carbon atoms in which at least a part of carbons and/or hydrogens is substituted with at least one member selected from the group consisting of a halogen, oxygen, sulfur, nitrogen and silicon; and $$O\text{=}C\text{=}N\text{—}R^4\text{—}N\text{=}C\text{=}O \tag{4}$$

wherein

N represents nitrogen; C represents carbon; O represents oxygen; and R4 represents a cyclic hydrocarbon group having from 6 to 20 carbon atoms or a cyclic hydrocarbon group having from 6 to 20 carbon atoms in which at least a part of carbons and/or hydrogens is substituted with at least one member selected from the group consisting of a halogen, oxygen, sulfur, nitrogen and silicon.

13. The nonaqueous electrolyte secondary battery according to claim 9, wherein the nonaqueous solvent comprises a cyclic carbonate selected from the group consisting of: 4-fluoro-1,3-dioxolan-2-one, 4,5-difluoro-1,3-dioxolan-2-one, 4-chloro-1,3-dioxolan-2-one and trifluoromethylethylene carbonate.

14. The nonaqueous electrolyte secondary battery according to claim 9, wherein the solid electrolyte interface coating is formed by heat pressing the negative electrode and the electrolyte.

15. The nonaqueous electrolyte secondary battery according to claim 14, wherein the heat pressing is performed at a pressure of 0.05 MPa to 10 MPa.

16. The nonaqueous electrolyte secondary battery according to claim 9, wherein the electrolyte contains the isocyanate compound in a proportion of from 0.01 to 5 parts by weight based on 100 parts by weight of the nonaqueous solvent.

* * * * *